United States Patent

[11] 3,628,165

[72] Inventor William O. Swan, Jr.
Sunnyvale, Calif.
[21] Appl. No. 760,943
[22] Filed Sept. 19, 1968
[45] Patented Dec. 14, 1971
[73] Assignee Anderson Jacobson, Inc.
Mountain View, Calif.

[54] DIGITAL FREQUENCY DISCRIMINATOR
18 Claims, 4 Drawing Figs.

[52] U.S. Cl. .................................................... 329/104, 307/236, 325/320, 328/140, 329/126
[51] Int. Cl. .................................................... H04l 27/14
[50] Field of Search .................................................... 329/126, 104, 110, 134; 328/48, 140; 307/220, 236; 325/30, 320; 178/66

[56] References Cited

UNITED STATES PATENTS

| | | | |
|---|---|---|---|
| 2,912,573 | 11/1959 | Mitchell | 329/134 X |
| 2,992,384 | 7/1961 | Malbrain | 328/48 X |
| 3,128,437 | 4/1964 | Loughlin | 329/126 X |
| 3,230,457 | 1/1966 | Soffel | 329/110 X |
| 3,350,580 | 10/1967 | Harrison | 328/48 X |
| 3,353,112 | 11/1967 | Richards | 328/48 X |
| 3,092,736 | 6/1963 | Ernyei | 329/104 X |

*Primary Examiner*—Alfred L. Brody
*Attorneys*—Samuel Lindenberg and Arthur Freilich ABSTRACT: A frequency discriminator with a signal limiter and level detector for digital communication systems using frequency modulation is provided by an arrangement for effectively measuring the period of a frequency modulated signal. A counter sets and resets a first flip-flop in accordance with the frequency shift of the signal within a given range, and sets a second flip-flop for one cycle of the input signal each time the period of the signal is determined to be for a frequency outside that range. The limiter at the input of the discriminator employs an integrating capacitor to set the maximum level of the input signal as a function of the input signal amplitude, and the level detector, set for a predetermined acceptable signal level, is connected to that capacitor. A second integrating capacitor connected in parallel with the first through a blocking diode is provided with a large RC time constant as compared with that of the first integrating capacitor for a long turn-on time, as compared with the turnoff time for the level detector. The second flip-flop set by the discriminator removes an insignificant fixed charge from the first integrating capacitor each time it is set. The charge removal becomes significant only when its average rate exceeds a predetermined level.

INVENTOR.
WILLIAM O. SWAN JR
BY Lindenberg & Freilich
ATTORNEY

INVENTOR.
WILLIAM O. SWAN JR
BY Lindenberg & Freilich
ATTORNEY

DIGITAL FREQUENCY DISCRIMINATOR

BACKGROUND OF THE INVENTION

1. Field of the Invention

This invention relates to data terminals in digital communication systems using frequency modulation, and in particular to a frequency discriminator including a signal limiter and level detector.

2. Description of the Prior Art

In digital communication systems employing binary frequency modulation commonly C. frequency-shift keying, two tones or frequencies represent the binary 1 or mark and the binary 0 or space characters used to compose messages. A receiver must then detect the two tones and provide a binary coded pulse train for use in a computer, teleprinter or other utilization device.

In a patent application filed concurrently herewith by Wayne C Seppeler titled "Digital Frequency Discriminator," and assigned to the assignee of the present application, there is disclosed a binary counter and synchronized decoder in an arrangement for effectively measuring the period of a frequency modulated signal, and to set or reset a flip-flop according to whether the period of the signal is one or the other of two frequencies. A clock-pulse generator of the relaxation-oscillator type (set to operate at a frequency higher than the two frequencies being discriminated) is synchronized by the leading edge of the received signal to restart oscillations with a full cycle. At substantially the same time, the number of clock pulses accumulated by the counter during a preceding period of the received signal is sampled by the decoder. Immediately thereafter, the counter is reset to zero in order that clock pulses generated during the extant period may be accumulated.

The foregoing digital discriminator has all of the advantages of prior art zero-crossing detectors in addition to the advantages inherent in digital techniques, such as precision, and with integrated circuits, size, weight and possibly even cost. As in the prior art zero-crossing detectors, an amplifier and limiter is employed to transform the sine wave of the input signal to a rectangular wave.

Any apparent shift in the input signal frequency outside of the two frequencies employed for the binary characters is due to noise in the transmission line or some deterioration in the quality of the transmitted signal. It would be desirable to detect such a condition and signal the utilization device accordingly, but not each time such a condition is detected upon attempting to measure the period of the input signal since such may only be momentary and proper transmission of data to the utilization device may be accomplished by simply ignoring such a condition unless a predetermined percentage of the measurements being made are outside the time range to be accepted by the digital discriminator, i.e., outside the expected difference between the two frequencies being discriminated. It would also be desirable to provide a signal limiter with a level detector which has a relatively long turn-on time, a shorter turnoff time, and an even shorter recovery time if the input signal level drops only momentarily. When the input signal drops below a predetermined level, the level detector may then signal the utilization device accordingly. If the utilization device is to be signalled for both conditions, it would be desirable to integrate both the noise and the signal level detecting functions to provide only one signal to the utilization device.

OBJECTS AND SUMMARY OF THE INVENTION

A primary object of this invention is to provide a digital frequency discriminator for use in terminals of frequency modulation systems.

Another object is to provide a limiter and level detector for use with a frequency discriminator.

Still another object is to provide a digital frequency discriminator with a system for detecting noise in, or some deterioration of, the input signal and for signalling the utilization device when the adverse condition being detected is present for a predetermined percentage of the input signal cycles.

According to the invention, a synchronized decoder is employed with a binary counter to effectively measure the period of a frequency modulated signal, and to set or reset a flip-flop according to whether the period of the signal is one or the other of the two frequencies. A second RS flip-flop is set if the number of clock pulses counted during a given cycle is representative of a frequency below the lowest frequency or a frequency above the highest frequency to be discriminated. Sampling of the number registered in the counter occurs at the end of each cycle of the input signal as determined by the leading edge of the next cycle. Immediately thereafter, the counter is reset.

In order that the leading edge of a given cycle be readily identified in point of time, the input signal is first amplified and then limited to transform the sine wave of the input signal to a rectangular wave. THe leading edge of the rectangular wave is then differentiated to derive a sampling pulse. The limiting function is provided by a pair of diodes so connected that they are alternately forward biased by the input signal, thereby initially limiting both half cycles to the voltage drop across the diodes. One diode is connected directly to ground while the other diode is connected to ground through a capacitor. Thus, although both half cycles are initially limited to the voltage drop across the diodes, in time the capacitor charges to a predetermined maximum level established by the input signal frequencies and a resistor in parallel therewith, whereupon, the amplitude of one half cycle is increased to the level established by that predetermined charge and the IR drop of the diode connected to the capacitor. The junction between the diode and the capacitor is connected to a level detector or voltage comparator, such as a Schmitt trigger circuit, which transmits to the utilization device a signal when the charge of the capacitor drops below a predetermined level, thereby indicating a drop in the frequency of the input signal below a predetermined value or some other deterioration of the input signal. A second capacitor is connected in parallel with the first capacitor by a third diode such that as the first capacitor charges, the second capacitor also charges to the same level, less the voltage drop across the third diode. When the first capacitor quickly discharges due to, for example, loss of the input signal, the third diode isolates the charge on the second capacitor. A second resistor is connected in parallel with the second capacitor. The time constant of the second capacitor and its parallel resistor is large compared to the time constant of the first capacitor and its resistor. In that manner, the signal level detector has a relatively long turn-on time owing to the size of the second capacitor, a short turnoff time established primarily by the resistor in parallel with the first capacitor, and a rapid recovery time owing to the relatively small size of the first capacitor. The first capacitor is also connected to the output of the second RS flip-flop by a switch which conducts to remove a predetermined amount of charge from the first capacitor each time that flip-flop is set to indicate the frequency of the input signal is outside the time range to be accepted by the digital discriminator. The amount of charge removed at a given time is not sufficient to cause the level detector to indicate a loss of the input signal if the percentage of time the frequency of the input signal is outside the time range to be accepted by the digital discriminator is less than a predetermined value.

The novel features of this invention are set forth with particularity in the appended claims. The invention will best be understood from the following description when read in conjunction with the accompanying drawings.

DESCRIPTION OF THE PREFERRED EMBODIMENTS

Figure 1:
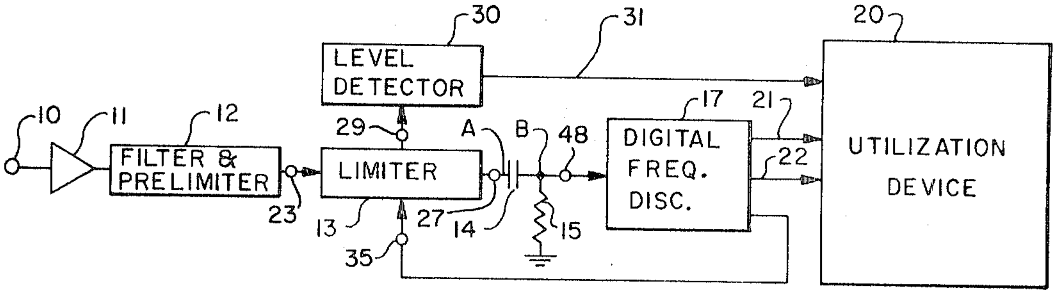
FIG. 1 illustrates a functional block diagram of the present invention.
Figure 3:
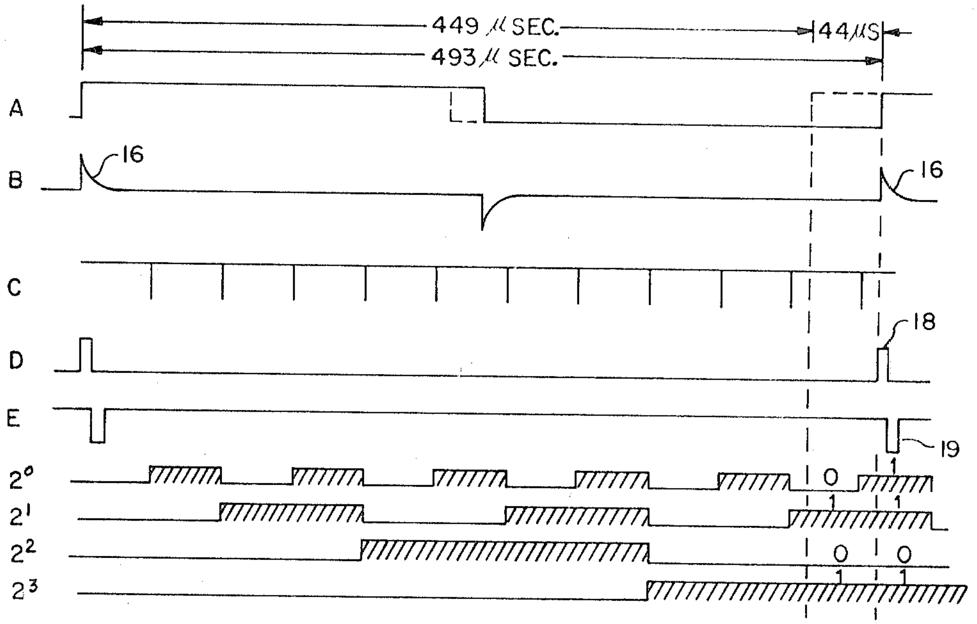
FIG. 3 is a timing diagram illustrating the operation of a preferred embodiment of the system in FIG. 1.

Referring now to FIG. 1, a frequency modulated signal is received at an input terminal 10 of an amplifier 11 coupled by a band-pass filter and prelimiter 12 to a limiter 13 which transforms the sine wave of the input signal to a rectangular wave as shown by waveform A in FIG. 3. It should be understood that the waveforms of FIG. 3 are illustrated solely for the purpose of establishing time relationships and that the relative amplitudes of the various waveforms are not proportional.

Figure 2:
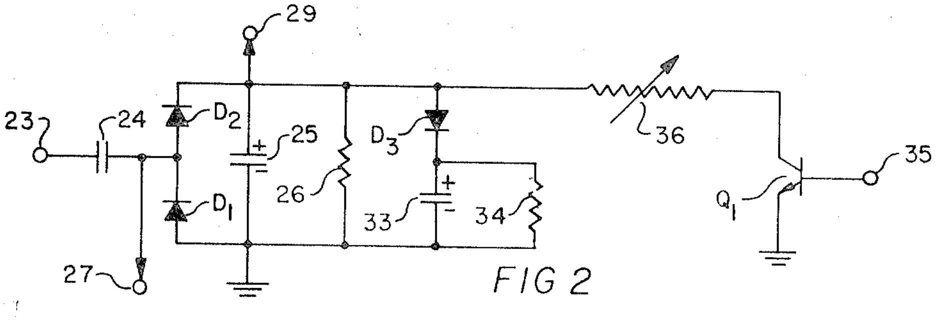
FIG. 2 illustrates an improved limiter useful in the system of FIG. 1.

The sequence of operation for the system of FIG. 1 begins with the positive going transition of the waveform A which is differentiated by a network comprising a capacitor 14 and a resistor 15 to provide sharp pulses 16 illustrated in the waveform B of FIG. 2. Each of those pulses initiates a cycle of a digital frequency discriminator 17 by recycling a relaxation oscillator contained therein to begin producing clock pulses illustrated by the waveform C. The period of the clock pulse generator is set equal to the difference between the periods of the two frequencies to be discriminated which are 2,025 Hz. and 2,225 Hz. in the preferred embodiment to be described with reference to FIG. 4.

A counter within the digital frequency discriminator 17 counts the number of clock pulses transmitted by the relaxation oscillator during a given cycle of the input signal. At the beginning of the next cycle, the next positive pulse of the waveform 16 initiates another frequency discriminating cycle by again recycling the relaxation oscillator. At the same time, a sampling pulse is generated such as a sampling pulse 18 illustrated by the waveform D of FIG. 3. A flip-flop is then either set or reset according to whether the number of pulses counted within the last period of the input signal corresponds to one or the other of the frequencies of the input signal at the terminal 10. The output terminals of the flip-flop are connected to a utilization device 20 by lines 21 and 22 in order to transmit thereto a train of binary 1 and 0 pulses (mark and space signals) and binary complements thereof for recording or some other use. Immediately thereafter, the binary counter within the digital frequency discriminator 17 is reset by a pulse 19 illustrated in waveform E of FIG. 3. In practice, the pulse 19 is derived from the trailing edge of the sampling pulse 18 in order to assure that sampling the number stored in the counter is accomplished before it is reset.

A circuit diagram of the limiter 13 is illustrated in FIG. 2 as comprising a pair of diodes $D_1$ and $D_2$ connected in series with the junction therebetween coupled to an input terminal 23 by a capacitor 24. An integrating capacitor 25 and a resistor 26 are connected in parallel across the diodes $D_1$ and $D_2$. The junction of the capacitor 25 and the anode of the diode $D_1$ is connected to ground. Therefore, initially both diodes $D_1$ and $D_2$ are forward biased such that $D_1$ conducts on negative half cycles on the input signal and $D_2$ on positive half cycles. The output signal from the limiter at a terminal 27 is thus initially limited in peak-to-peak amplitude to the voltage drops across the diodes $D_1$ and $D_2$ and thereafter to those voltage drops and the charge stored in the integrating capacitor 25. That output terminal 27 is connected to the capacitor 14 in FIG. 1.

Capacitor 25 is selected to be much larger than capacitor 24, and the time constant of the capacitor 25 and resistor 26 is selected to be much larger than the period of the signal at terminal 23. Consequently, the maximum level of voltage on capacitor 25 is directly proportional to the product of the frequency and amplitude of the input signal at terminal 23, and is inversely related, although not proportionally so, to the resistance of the resistor 26. Thus, the maximum charge of capacitor 25 is independent of its capacitance value.

Figure 4:
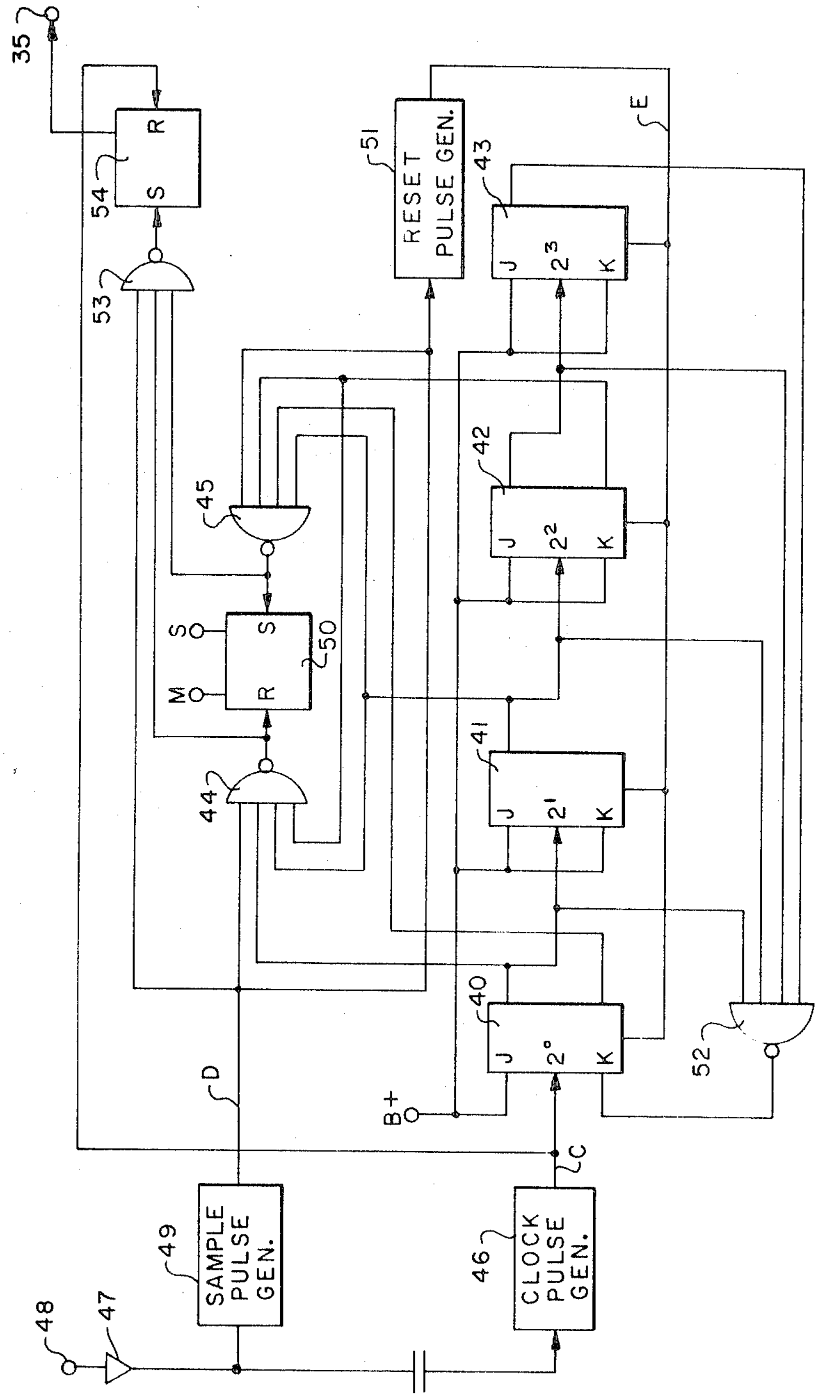
FIG. 4 illustrates a preferred embodiment of the present invention.

In the particular application of the limiter, to be described more fully with reference to FIG. 4, the input signal frequencies of interest do not differ widely. Accordingly, the change in voltage stored in capacitor 25 due to changes between frequencies of interest will be small. In other words, between the frequencies of interest, the maximum voltage to which capacitor 25 may be charged is primarily determined by the size of the capacitor 24, the amplitude of the signal at terminal 23, and the size of the resistor 26. Since the filter and prelimiter 12 (FIG. 1) determines the maximum amplitude of the input signal at terminal 23, the maximum voltage to which the capacitor is charged depends only upon the size of the capacitor 24 and the size of the resistor 26. But if the input signal should drop sufficiently in amplitude, the charge stored in the capacitor 25 will drop, and the voltage at terminal 29 will drop below a predetermined voltage level. The level detector 30 (FIG. 1) will then effectively signal the utilization device 20 over a line 31 that the input signal is no longer being reliably received, preferably in less than 1/10 of a second. The level detector 30 may be any suitable voltage comparator or threshold device, such as a Schmitt trigger circuit, the output of which is at one level only so long as the voltage at the terminal 29 remains above the aforesaid predetermined voltage level.

The significance of a feedback connection from the frequency discriminator 17 and a terminal 35 of the limiter 13 as shown in FIG. 1 will now be described with reference to FIGS. 2 and 4. In order that the limiter will have a relatively long turn-on time (for example, over 1 second) while the turnoff time established by the RC time constant of the capacitor 25 and the resistor 26 is less than 1/10 of a second, a second capacitor 33 is connected in parallel with the capacitor 25 by a third diode $D_3$. Thus, to turn the level detector 30 on initially, both the capacitor 25 and the capacitor 33 must be charged. The values of the capacitors 25 and 33 may be, for example, 1.0 $\mu$fd., and 100 $\mu$fd., respectively. A relatively large resistor 34 is connected in parallel with the capacitor 33 in order to provide a relatively long time constant for the discharge path of the capacitor 33. In that manner, more than 1 second would be required to charge the capacitors 25 and 34 but once the input signal is lost, the capacitor 25 quickly discharges through the resistor 26, thereby reverse biasing the diode $D_3$ to isolate the charge of the capacitor 33. By providing a relatively long RC time constant for the discharge of the capacitor 33 through the resistor 34, rapid recovery of the limiter is achieved if the input signal level drops only momentarily because the smaller capacitor 25 may be quickly recharged even if it has completely discharged provided the capacitor 33 has been allowed to discharge only partially while the signal was lost.

If the frequency of the input signal is outside the range to be accepted by the digital discriminator as a binary 1 or 0 (mark or space) a second RS flip-flop 54 (FIG. 4) is momentarily set. A terminal 35 connected to the base of an NPN-transistor $Q_1$ (FIG. 2) is so connected to an output terminal of that RS flip-flop that while it is set, the transistor $Q_1$ is turned on, thereby removing a predetermined quantity of the charge from the capacitor 25. A potentiometer 36 is adjusted to determine the quantity removed while transistor $Q_1$ is turned on, which on the illustrated embodiment is approximately 44 microseconds, but may be as long as one full cycle of the input signal. THe charge removed during a given cycle of the input signal is not sufficient to cause the voltage at terminal 29 to drop sufficiently to produce, via the level detector 30, a signal on line 31 indicating a loss of the input signal, but a predetermined percentage of cycles during which the transistor $Q_1$ is turned on will cause enough charge to be removed from the capacitor 25 to produce such a signal on the line 31.

Referring now to FIG. 4, the digital frequency discriminator is shown in a preferred embodiment as comprising a four-stage binary counter consisting of triggered JK flip-flops 40 to 43 and a synchronized decoder consisting of NAND-gates 44 and 45.

A clock pulse generator 46 designed to generate the clock pulses illustrated in the waveform C of FIG. 3 connected to the trigger input of the flip-flop 40 in order that all of the clock pulses produced during a given cycle of the input signal may be counted. The clock pulse generator 46 is recycled by a pulse 16 of waveform B produced by the positive-going leading edge of an input signal through an inverter 47 having its input terminal 48 connected to the output of the differentiating network comprising capacitor 14 and resistor 15 (FIG. 1). At the same time, a sample pulse generator 49 is triggered to produce the positive pulse 18 of waveform D (FIG. 3) after a given cycle of the input signal has been completed. That sample pulse is applied to the NAND-gates 44 and 45 in order to set or reset an RS flip-flop 50 according to whether the number of clock pulses counted during the last cycle of the input signal correspond to a frequency of 2,225 Hz. (binary 1 or mark) or 2,025 Hz. (binary 0 or space).

As indicated by the last four waveforms of FIG. 3, the count corresponding to a frequency of 2,225 Hz. is 1,010 while the count corresponding to the frequency of 2,025 Hz. is 1,011. Accordingly, the gate 44 is connected to effectively detect the count 1011 while the gate 45 is connected to effectively detect the count 1010. That is accomplished by connecting input terminals of the gates 44 and 45 to appropriate output terminals of the flip-flops 40, 41 and 42. Although the state of the with flip-flop 43 is required to uniquely define the counts 1010 and 1011, connections from the true output terminal of the flip-flop 43 to the gates 44 and 45 are not provided since other frequencies which may produce the same are too far removed to present any problem of ambiguity. In other words, while 10 or 11 clock pulses are counted in the preferred embodiment of the invention (where the period of frequencies. clock pulse is made equal to the difference between the periods of input signals at the two frequencies 2,025 and 2,225 Hz.) for normal mark and space signals, seven or eight pulses more or less must be counted during a given cycle of some other frequency to produce an erroneous setting or resetting of the flip-flop 50. However, it should be understood that the fourth flip-flop 43 may be connected to the gates 44 and 45 to eliminate even that possibility of error.

It should also be understood that the period selected for the clock pulses need not be equal to the difference between the periods of mark and space signals. It could instead be made equal to a fraction of that difference, as in the aforesaid application filed concurrently herewith by Wayne C. Seppeler. Immediately after the sample pulse 18 has occurred to set or reset the flip-flop 50, as required, a reset pulse generator 51 is triggered by the trailing edge of the sample pulse 18 to generate the negative going reset pulse 19 as shown in the waveform E of FIG. 2. That reset pulse is applied to the reset terminal of each of the flip-flops 40 to 43 in order that the counter may be prepared to start counting clock pulses generated during the next cycle of the input signal.

Each of the flip-flops 40 to 43 is a JK flip-flop having the J (set) and K (reset) input terminals connected to a source of positive bias potential B+ except the first flip-flop 40 which has its K input terminal connected to the output terminal of a NAND-gate 52. The NAND-gate 52, and all other NAND gates of the system, are designed for positive logic with binary 0 equal to 0 volts and binary 1 equal to, for example, +7 volts. Accordingly, the flip-flop 40 will be complemented (switched from its present state to its alternate state) in response to each negative clock pulse from the generator 46 as long as any input to the gate 52 is a binary 0 (so that its output terminal connected to the K input terminal of the flip-flop 40 is a binary 1).

Each of the following cascade connected flip-flops 41, 42 and 43 will be complemented in response to a negative going transition of the voltage signal connected to its trigger input terminal from the true output terminal of its preceding stage. Accordingly, the counter will count 16 clock pulses in the usual manner of a binary counter until all flip-flops have been set and all input signals to the NAND-gate 52 are binary 1, at which time the output terminal thereof is 0 volts to prevent the flip-flop 40 from responding further to clock pulses from the generator 46 since, with the K input terminal at 0 volts and the J input terminal connected to B+, the only response possible to a clock pulse from the generator 46 is to set the flip-flop 40 to the binary 1 state, the state in which it already is. This feature of disabling the counter at a full count of 1111 will prevent erroneous switching of the flip-flop 50 due to extremely low frequencies. Thus, the only error which may occur by not connecting the flip-flop 43 to the gates 44 and 45 may be in response to frequencies higher by an order of magnitude of approximately three, a region where no problems are anticipated. Accordingly, the flip-flops 40, 41 and 42 connected to the decoding gates 44 and 45 may be regarded as the counter for the digital discriminator. The fourth flip-flop 43 is provided simply for the purpose of preventing the counter from recycling after 15 clock pulses have been counted.

As noted hereinbefore, with reference to FIG. 2, a switch comprising transistor $Q_1$ is momentarily switched on to remove a predetermined charge from the capacitor 25 whenever the input signal is of a frequency having a period outside the time range which can be detected by a count of 10 or 11 pulses, which is once during each cycle if neither of the NAND-gates 44 and 45 are enabled to transmit an inverted sample pulse from the generator 49. That is accomplished by connecting output terminals of the gates 44 and 45 to input terminals of a NAND-gate 53 which is then enabled to transmit an inverted sample pulse t the set input terminal of a flip-flop 54 whenever neither one of the gates 44 and 45 is enabled to transmit an inverted sample pulse to the flip-flop 50, since the positive sample pulse is applied directly to a third input terminal of the NAND-gate 53 when the flip-flop 54 is not to be set.

Once the flip-flop 54 has been set, its output terminal 55 is driven from 0 volts to, for example, +7 volts. That output terminal 55 is connected to the input terminal 35 of FIG. 2 so that the transistor $Q_1$ is switched on while the flip-flop 54 is set. The flip-flop 54 is then reset within 44 microseconds by the next clock pulse, i.e., the first clock pulse of the next frequency discriminating cycle applied directly from the clock pulse generator 46 to the reset input terminal of the flip-flop 54. As noted hereinbefore, the quantity of charge removed form the capacitor 25 is adjusted by the potentiometer 36 in order that the voltage at the output terminal 29 is not decreased sufficiently to produce an indication over line 31 (via the level detector 30 of FIG. 1) to the utilization device 20 that the input signal has been lost unless a predetermined percentage of the frequency discriminating cycles result in the flip-flop 54 being set. The transistor $Q_1$ may be left switched on for a full cycle of the input signal by resetting the flip-flop 54 with a reset pulse from the generator 51 (pulse 19 of FIG. 3). The resistance of the potentiometer 36 is then increased proportionately.

Although a particular embodiment of the present invention has been described and illustrated, it is recognized that modifications and variations may readily occur to those skilled in the art, particularly in the pulse-generating circuits illustrated by functional blocks in FIG. 4 but actually implemented in a manner similar to that disclosed in the aforesaid application filed concurrently herewith by Wayne C. Seppeler.

What is claimed is:

1. In a frequency-shift digital communications receiver system, apparatus for discriminating between two frequencies of an input signal comprising:

means for counting clock pulses with a digital counter having a plurality of cascaded stages for storing binary signals representing numbers, including a least significant stage for storing binary signals representing the least significant digits of numbers store;

means for determining whether the number of pulses counted at the conclusion of a given cycle of said input signal corresponds to one of said two frequencies; and means for preventing said counter from counting additional clock pulses significantly beyond the maximum number of clock pulses which should be counted during a given cycle for the lower of said two frequencies being discriminated.

2. Apparatus as defined in claim 1 wherein said last-named means comprises:

decoding means for generating an inhibit signal when said counter has reached a predetermined number greater than said maximum number during a given cycle: and means responsive to said inhibit signal for inhibiting operation of said counter during said given cycle, thereby preventing further pulses from being counted.

3. Apparatus as defined in claim 2 wherein said counter comprises a triggered JK flip-flop in said least significant stage, said JK flip-flop having a trigger input terminal, and J and K control terminals, said JK flip-flop further having said clock pulses applied to said trigger input terminal, a binary-1 signal applied to said J input terminal, and said decoding means comprises a NAND gate having its output terminal connected to said K input terminal said NAND gate having each of its input terminals connected to a different stage of said counter.

4. In a frequency-shift digital communications receiver system having a utilization device the combination comprising:

a counter;

means for discriminating between two frequencies of an input signal by counting clock pulses with said counter;

means for determining the number of pulses counted by said counter at the conclusion of a given cycle of said input signal;

means responsive to said determining means for transmitting to said utilization device binary signals corresponding to said two frequencies as detected;

means for limiting said input signal to a predetermined level;

means connected to said limiting means for detecting when the level of said input signal falls below a predetermined peak-to-peak level and means in response to said level detecting means for transmitting a signal to said utilization means indicating the input signal has fallen below said predetermined level.

5. The combination as defined in claim 4 wherein said limiting means responds to said input signal to set the level to which it will be limited as a function of the product of the input signal frequency and amplitude whereby a significant drop in the product may limit said input signal to a level below said predetermined level.

6. The combination as defined in claim 4 wherein said limiting means comprises:

a first diode coupling said input signal to a source of fixed reference potential;

an integrating capacitor; and a second diode connected in series with said integrating capacitor, the anode of one of said first and second diodes being connected to the cathode of the other whereby an integrating capacitor is provided in parallel with said first and second series connected diodes; and a resistor in parallel with said capacitor, whereby said input signals is limited in voltage amplitude by the voltage to which said capacitor is charged at any given time.

7. The combination as defined in claim 6 wherein the RC time constant of said capacitor in parallel with said resistor is selected to provide a substantially constant charge across said capacitor at a level above said predetermined valve for an input signal of a predetermined amplitude and a frequency in a range defined approximately by said two frequencies.

8. The combination as defined in claim 7 including means for removing a predetermined charge from said capacitor if the number of pulses counted during a given frequency determining cycle is representative of an input signal at a frequency outside said range.

9. The combination as defined in claim 8 wherein the charge removed during said given cycle is selected to be by itself insufficient to lower the level to which said input signal is to be limited with respect to said reference potential below said predetermined value, but sufficient when combined with charge removals during other cycles at a predetermined rate.

10. The combination as defined in claim 6 wherein said limiting means further includes a third branch in parallel with said integrating capacitor comprising a relatively large capacitor in series with a diode, said diode being poled to transfer a charge from said integrating capacitor to said large capacitor, and a resistor in parallel with said large capacitor, whereby said limiter is provided with a long turn-on time required to charge said integrating capacitor to a substantially constant level for an input signal of a frequency in a range defined approximately by said two frequencies.

11. The combination as defined in claim 10 wherein the RC time constant of said integrating capacitor and said resistor in parallel therewith is selected to provide a turnoff time significantly less than said turn-on time to discharge said integrating capacitor when said input signal is removed, or its amplitude drops.

12. The combination as defined in claim 11 wherein said integrating capacitor is significantly smaller than said large capacitor whereby said integrating capacitor may be rapidly recharged to said substantially constant level if the input signal is removed or its amplitude drops only momentarily.

13. The combination as defined in claim 12 wherein said large capacitor is greater than said integrating capacitor by a factor of about 10 to 100.

14. The combination as defined in claim 13 including means for removing a predetermined charge from said integrating capacitor if the number of pulses counted during a given frequency determining cycle is representative of an input signal at a frequency outside said range.

15. The combination as defined in claim 14 wherein the charge removed during said given cycle is selected to be by itself insufficient to lower the level to which said input signal is to be limited with respect to said reference potential below said predetermined value, but sufficient when combined with charge removals during other cycles at a predetermined average rate of removal.

16. The combination as defined in claim 15 including means for preventing said counter from counting additional clock pulses significantly beyond the number of clock pulses which should be counted for the two frequencies being discriminated.

17. The combination as defined in claim 16 wherein said counter is allowed to count pulses until it has counted a predetermined number, and wherein said means comprises:

decoding means for determining when said counter has reached said predetermined number; and inhibiting means responsive to said decoding means for preventing further pulses from being counted.

18. The combination as defined in claim 17 wherein said counter comprises a plurality of cascaded stages for storing binary signals representing numbers, including a least significant stage for storing binary signals representing the least significant digits of numbers stored and a triggered JK flip-flop in said least significant stage, said JK flip-flop having a trigger flip-flop input terminal, and J and K control terminals, said JK flip-flop further having said clock pulses applied to said trigger input terminal, a binary-1 signal applied to said J input terminal, and said decoding means comprises a NAND gate having its output terminal connected to said K input terminal said NAND gate having each of its input terminals connected to a true output terminal of a different stage of said counter.

* * * * *